(12) United States Patent
Borud et al.

(10) Patent No.: US 10,569,642 B2
(45) Date of Patent: Feb. 25, 2020

(54) COOLING SYSTEM FOR AN ALL TERRAIN VEHICLE

(71) Applicant: Polaris Industries Inc., Medina, MN (US)

(72) Inventors: Eric Borud, Roseau, MN (US); Brian M. Safranski, Warroad, MN (US); Bradley A. Bracht, Salol, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 15/187,368

(22) Filed: Jun. 20, 2016

(65) Prior Publication Data

US 2017/0361700 A1  Dec. 21, 2017

(51) Int. Cl.
| | | |
|---|---|---|
| *B60K 11/06* | (2006.01) | |
| *B60K 1/00* | (2006.01) | |
| *B60K 11/08* | (2006.01) | |
| *B60K 13/04* | (2006.01) | |
| *B62D 55/00* | (2006.01) | |
| *B62D 55/24* | (2006.01) | |

(52) U.S. Cl.
CPC ............... *B60K 11/06* (2013.01); *B60K 1/00* (2013.01); *B60K 11/08* (2013.01); *B60K 13/04* (2013.01); *B62D 55/00* (2013.01); *B62D 55/24* (2013.01)

(58) Field of Classification Search
CPC ......... B60K 11/00; B60K 11/02; B60K 11/04; B60K 11/06; B60K 11/08
See application file for complete search history.

(56) References Cited

U.S. PATENT DOCUMENTS

| | | | |
|---|---|---|---|
| 2,967,075 A | 1/1961 | Christie | |
| 3,371,734 A | 3/1968 | Zaunberger | |
| 6,622,668 B2 * | 9/2003 | Izumi ..................... | E02F 9/00 123/41.49 |
| 7,455,136 B2 | 11/2008 | Pleune | |
| 8,376,441 B2 | 2/2013 | Nakamura et al. | |
| 8,936,122 B2 * | 1/2015 | MacGregor ............ | B60K 11/04 180/68.1 |
| 2003/0015356 A1 | 1/2003 | Wolfgang | |
| 2005/0217909 A1 | 10/2005 | Guay | |

(Continued)

FOREIGN PATENT DOCUMENTS

| | | |
|---|---|---|
| CN | 105050886 | 11/2015 |
| DE | 749376 | 11/1944 |

(Continued)

OTHER PUBLICATIONS

Patent Cooperation Treaty International Search Report and Written Opinion, PCT/US2017/038224 to Polaris Industries Inc., dated Nov. 15, 2017, 16 pages.

(Continued)

*Primary Examiner* — John D Walters
*Assistant Examiner* — James J Triggs
(74) *Attorney, Agent, or Firm* — Faegre Baker Daniels LLP

(57) ABSTRACT

A tracked vehicle is shown which includes an air cooling system having radiators for cooling an engine of the vehicle, and an auxiliary radiator for cooling an auxiliary system of the vehicle. The vehicle further includes an air cooling system for cooling an engine compartment of the vehicle having intake and exhaust ducts which are fan driven to move ambient air into and heated air out of the engine compartment.

41 Claims, 17 Drawing Sheets

(56) References Cited

U.S. PATENT DOCUMENTS

| | | |
|---|---|---|
| 2006/0249316 A1 | 11/2006 | Buller |
| 2008/0223639 A1 | 9/2008 | Barksdale |
| 2009/0166101 A1 | 7/2009 | Wenger |
| 2013/0048396 A1* | 2/2013 | Neilson ............... B60K 11/04 180/68.1 |
| 2014/0288763 A1 | 9/2014 | Bennett |

FOREIGN PATENT DOCUMENTS

| | | | | |
|---|---|---|---|---|
| DE | 1174182 | | 7/1964 | |
| DE | 19631012 | | 2/1998 | |
| DE | 102004050436 A1 * | | 4/2006 | ............ B60K 11/04 |
| DE | 102004050436 A1 | | 4/2006 | |
| EP | 0467523 A2 | | 1/1992 | |
| EP | 2565068 | | 3/2013 | |
| JP | H04252711 A | | 9/1992 | |
| JP | 10-083055 | | 5/2008 | |
| JP | 2010-235001 | | 10/2010 | |
| JP | 2012-171363 | | 9/2012 | |
| SU | 737253 | | 5/1980 | |
| TW | 200946375 | | 11/2009 | |

OTHER PUBLICATIONS

Taiwan Intellectual Property Office, English Translation Search Report for Taiwan Patent Application No. 106126511, dated Aug. 30, 2018; 2 pages.

Examination Report No. 1 issued by the Australian Government IP Australia, dated Jun. 17, 2019, for Australian Patent Application No. 2017281442; 5 pages.

English Translation of Search Report issued by the Taiwan Intellectual Property Office, dated Mar. 15, 2018, for related Taiwan Patent Application No. 106120111; 1 page.

\* cited by examiner

COOLING SYSTEM FOR AN ALL TERRAIN VEHICLE

BACKGROUND OF THE DISCLOSURE

The present disclosure relates to vehicles, and more particularly to utility and all-terrain vehicles.

Generally, all-terrain vehicles ("ATVs") and utility vehicles ("UVs") are used to carry one or more passengers over a variety of terrain. More particularly, some ATVs and UVs may include side-by-side seating, in which a passenger may be seated next to the driver at the front of the vehicle. Side-by-side vehicles also may include a rear seating area to accommodate additional passengers in the vehicle. A roll cage may be provided over the seating of the vehicle. Additionally, ATVs and UVs may provide a cargo area in the front and/or the rear of the vehicle in order to carry cargo. ATVs and UVs include ground-engaging members, which may be tires, tracks, skis, or any other device for moving the vehicle across the ground.

SUMMARY OF THE DISCLOSURE

In one embodiment, a vehicle comprises a frame; ground engaging members supporting the frame; an operator compartment supported by the frame; an engine compartment rearward of the operator area; a first radiator positioned rearward of the operator area on a first lateral side of the vehicle; a second radiator positioned rearward of the operator area on a second lateral side of the vehicle; wherein the first and second radiators are fluidly coupled together and to the engine for cooling the engine.

In another embodiment, a vehicle comprises a frame; ground engaging members supporting the frame; an operator compartment supported by the frame; an engine compartment rearward of the operator area, the engine compartment being enclosed; an input duct inputting ambient air into the engine compartment; and an exhaust duct exhausting air from the engine compartment.

In yet another embodiment, a vehicle, comprises a frame; ground engaging members supporting the frame; an operator compartment supported by the frame; an engine compartment rearward of the operator area, the engine compartment being enclosed; a primary radiator positioned rearward of the operator area on a first lateral side of the vehicle; an auxiliary radiator positioned rearward of the operator area on a second lateral side of the vehicle; a primary fan positioned adjacent to the primary radiator; an auxiliary fan positioned adjacent to the auxiliary radiator, wherein the fans are independently controllable.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
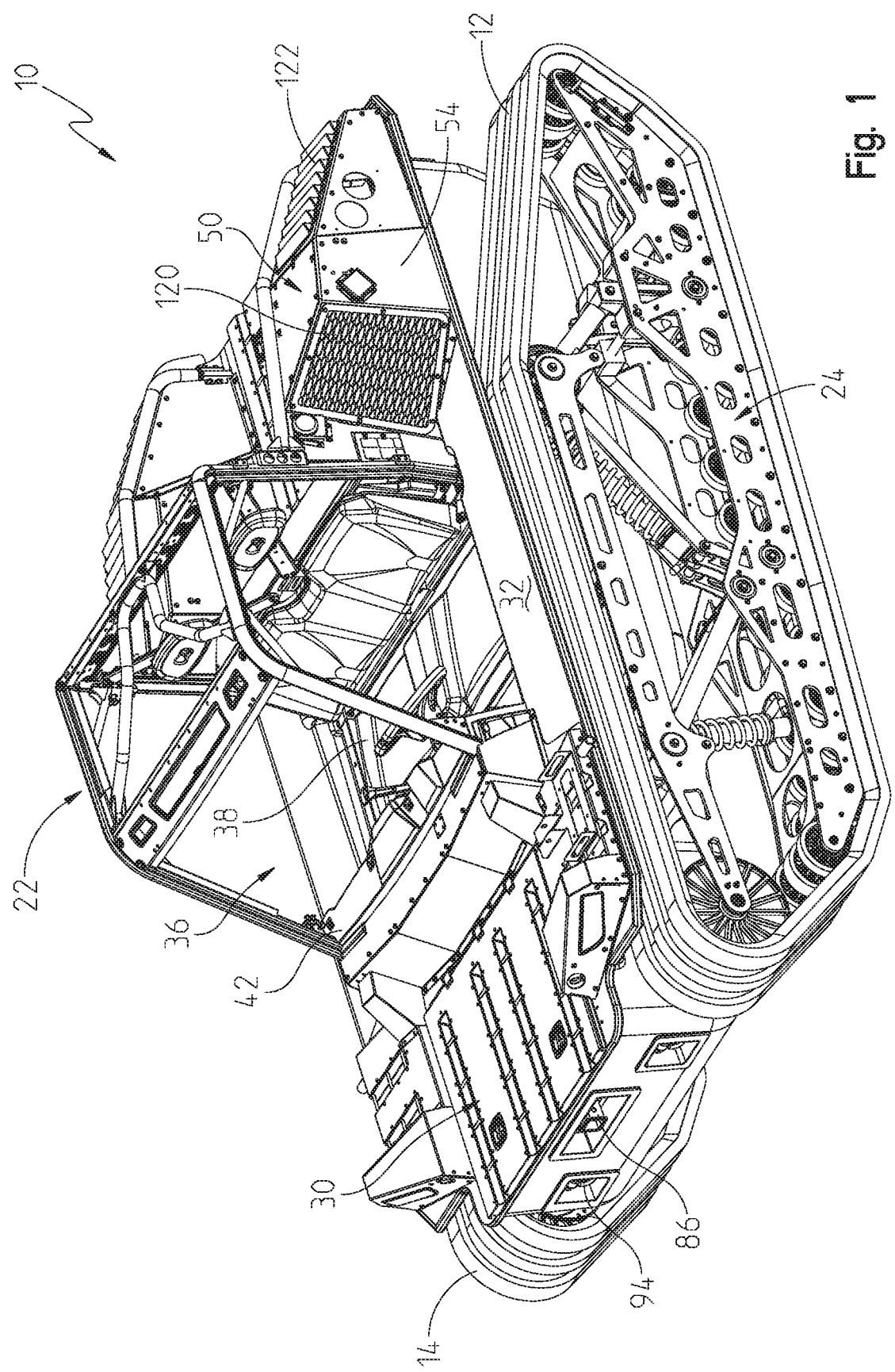
FIG. 1 is a left front perspective view of an illustrative vehicle of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles ("ATV"), utility vehicles ("UV"), motorcycles, watercraft, snowmobiles, side-by-side vehicle ("SxS"), and golf carts.

Figure 3:
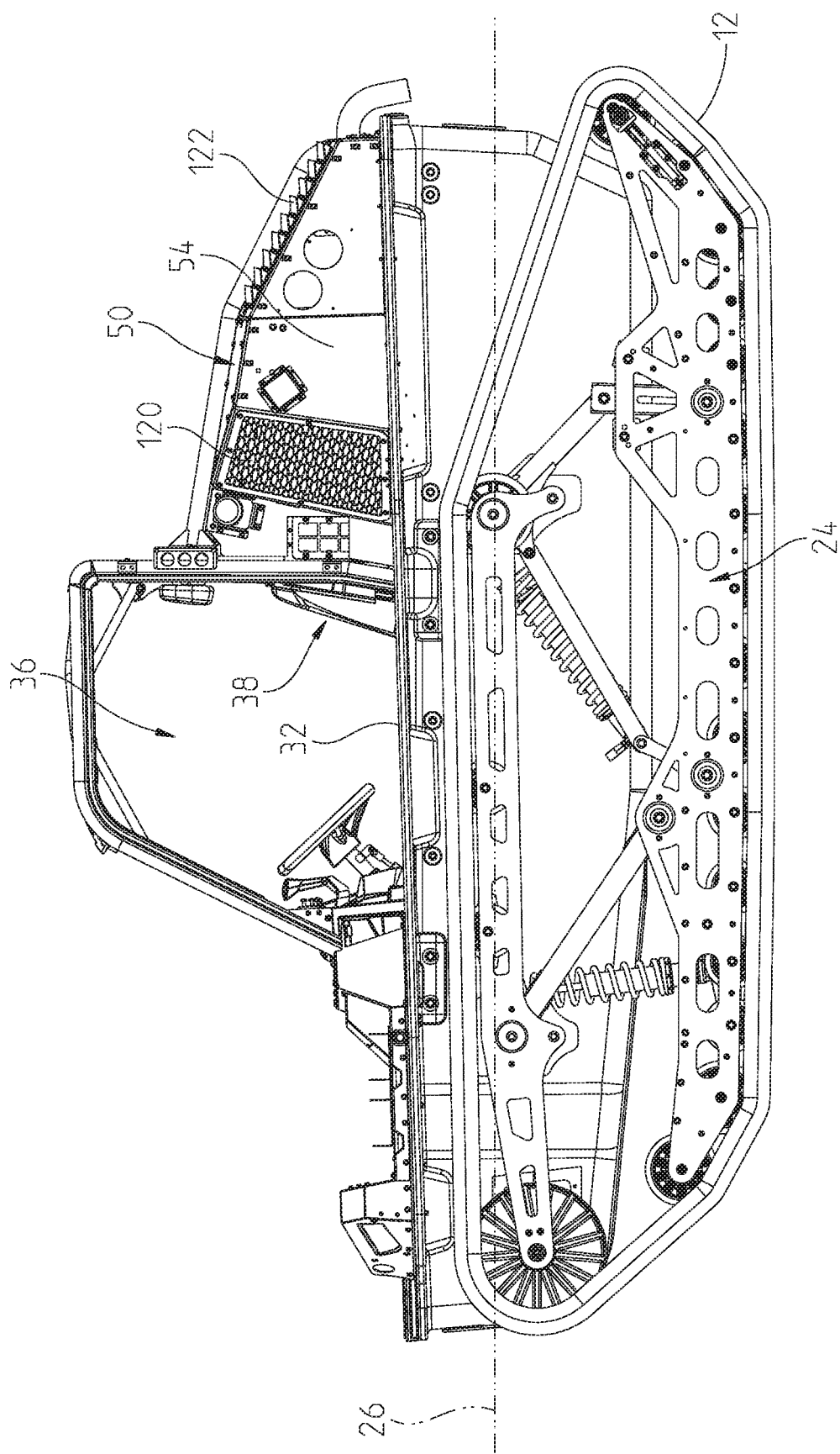
FIG. 3 is a left side view of the embodiment of the vehicle of FIG. 1.

Referring to FIG. 1, an illustrative embodiment of a vehicle 10 is shown. As detailed further herein, vehicle 10 may be a tracked ATV that includes ground engaging members, illustratively a left side track member 12 and a right side track member 14. Vehicle further includes a powertrain assembly 16 (FIG. 11), a frame assembly 18 (FIGS. 8-9), a body or tub 20 (FIGS. 8-9), a roll cage assembly 22, and a suspension assembly 24. Vehicle 10 may be configured for military applications and is configured to travel through various terrains or surfaces. More particularly, vehicle 10 is configured for both land and amphibious operation. In the case of amphibious operation, the waterline of the vehicle with a capacity load would be represented by line 26, as best shown in FIG. 3. Additionally, vehicle 10 may be autonomous and operated by remote control, as disclosed in U.S. patent application Ser. No. 14/968,487 filed Dec. 14, 2015; the subject matter of which is incorporated herein by reference. In one embodiment, vehicle 10 may be configured to travel at speeds of approximately 50 mph during land operation.

Figure 2:
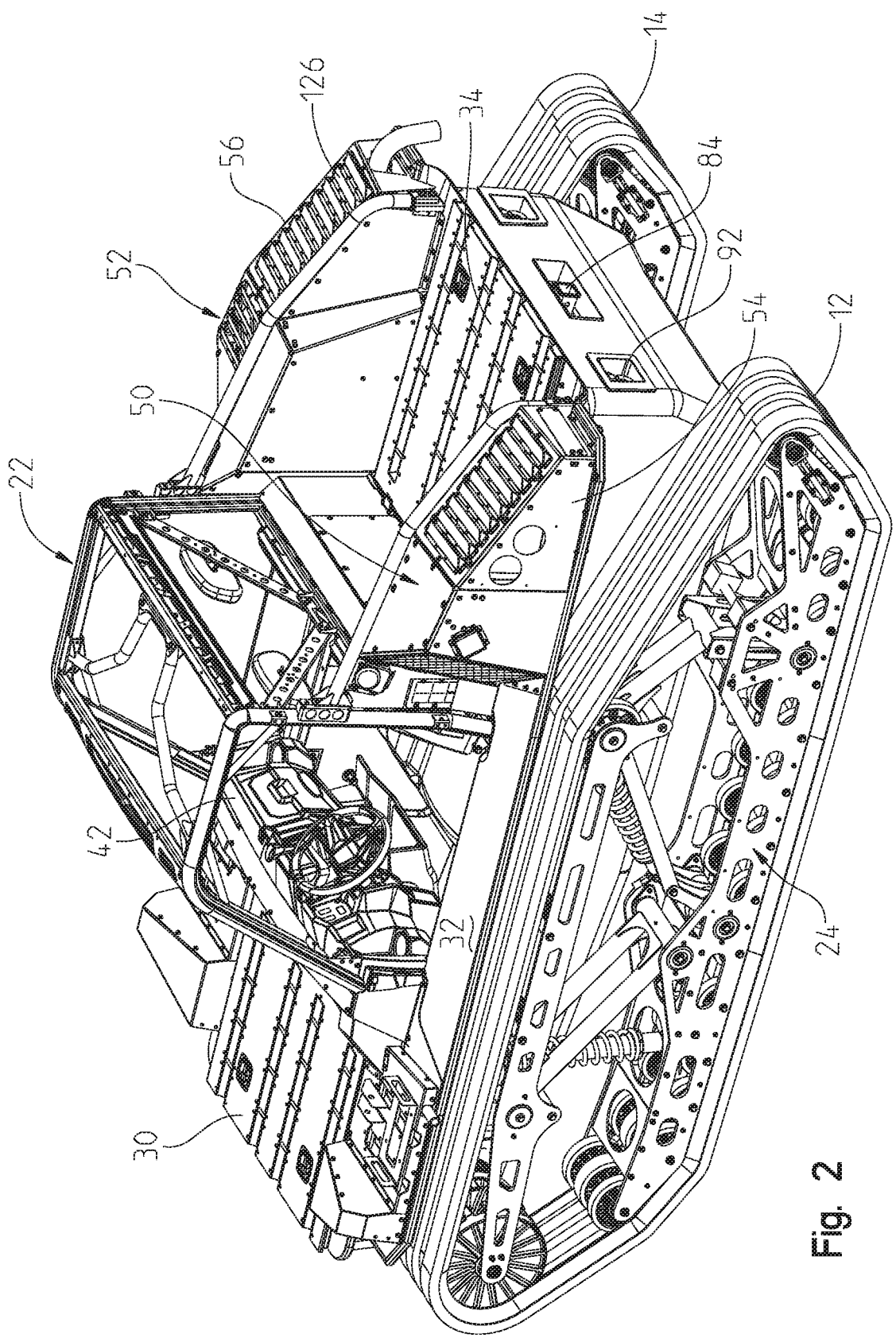
FIG. 2 is a left rear view of the embodiment of the vehicle of FIG. 1.

As shown in FIG. 1, frame assembly 18 is supported on track members 12, 14. In one embodiment, track members 12, 14 may be comprised of a polymeric material (e.g., rubber) and may be approximately 12 inches in width (approximately 0.3 m). Frame assembly 18 also may support a plurality of body members or panels, for example a hood 30, tub 20 having side fenders 32 and a rear deck 34 (FIG. 2). Additionally, frame assembly 18 supports an operator area 36, which includes a seat 38, a dash board assembly 42, and operator controls. Seat 38 provides a seating area for an operator and a passenger in a side-by-side arrangement and includes a seat back and a seat bottom. As shown, seat 38 is configured as a bench seat and the seat backs are configured as a single back rest. Alternatively, the seats may be separate from each other and be bucket seats.

Side fenders 32 are laterally outward of operator area 36 and may be provided as support structure for ingress and egress with vehicle 10. Hood 30 may support a front cargo area forward of operator area 36, as detailed further herein. As shown, rear cargo area 34 is a fixed cargo area. Alternatively, rear cargo area 34 may be a movable dump box configured to pivot upwardly and rearwardly for unloading cargo therefrom. In one embodiment, the base weight of vehicle 10 may be approximately 1750 lb (approximately 794 kg) and vehicle 10 may be configured to accommodate approximately 500 lbs (approximately 227 kg) of cargo. Vehicle 10 may be configured with features for distributing the weight of any cargo supported on vehicle 10 during land operation and amphibious operation. For example, the cargo weight may be distributed such that the combined center of gravity of vehicle 10 and the cargo is positioned approximately at a center point of vehicle 10. As such, vehicle 10 may not bias forwardly or rearwardly in the water during amphibious operation. As described herein, vehicle 10 may include a load level notification system to alert the operator of payload distribution.

Vehicle 10 further includes a first cooling system 50 and a second cooling system 52. The cooling system 50 includes a chamber 54 and second cooling system 52 includes a chamber 56. The chambers 54 and 56 are in the form of fender pods positioned on fenders 32. The cooling systems 50 and 52 provide cooling for components of the powertrain, as well as provide cooling for an engine compartment, as further described herein.

Figure 8:
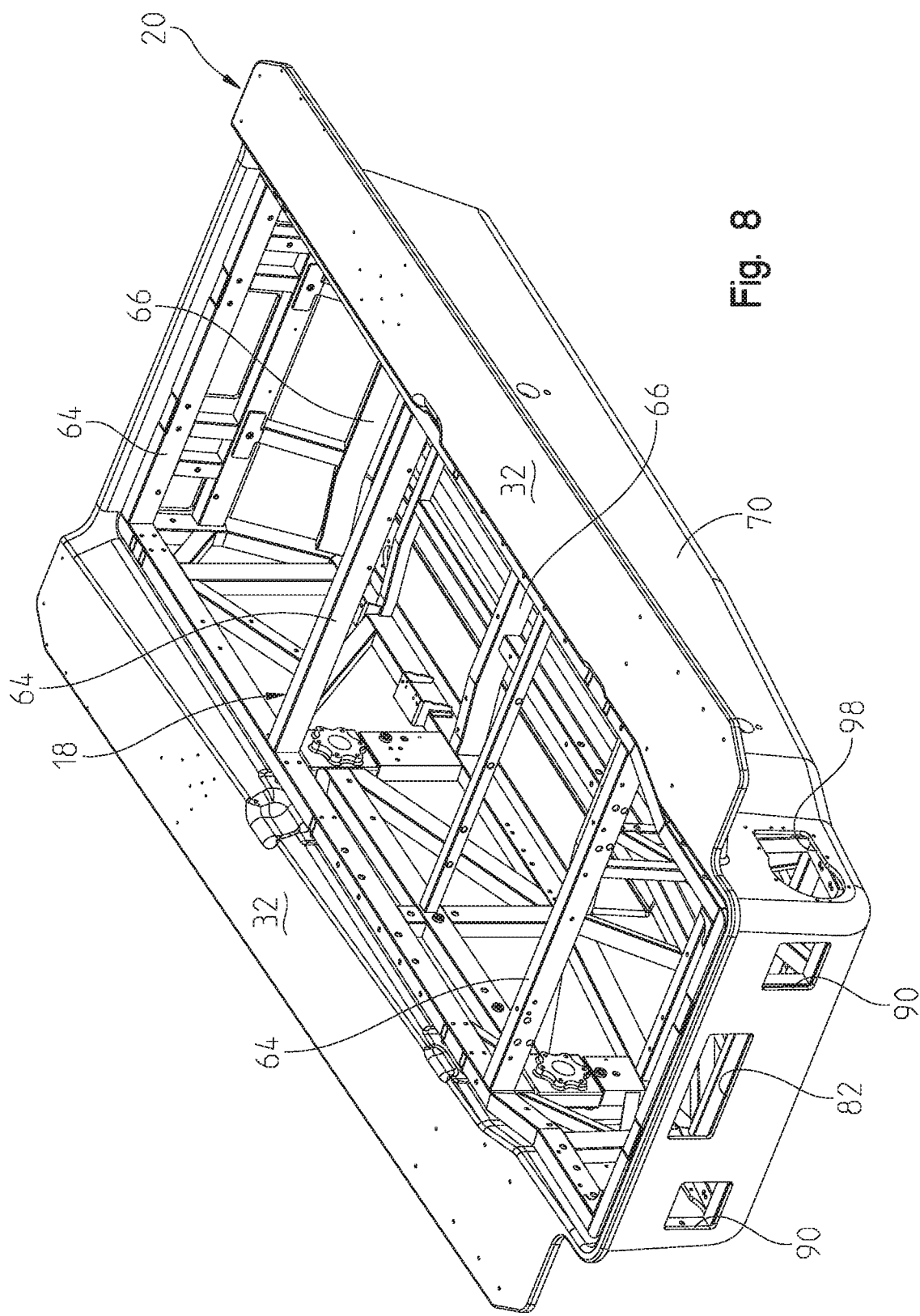
FIG. 8 is a left front perspective view of a frame assembly and a tub of the vehicle of FIG. 1.
Figure 9:
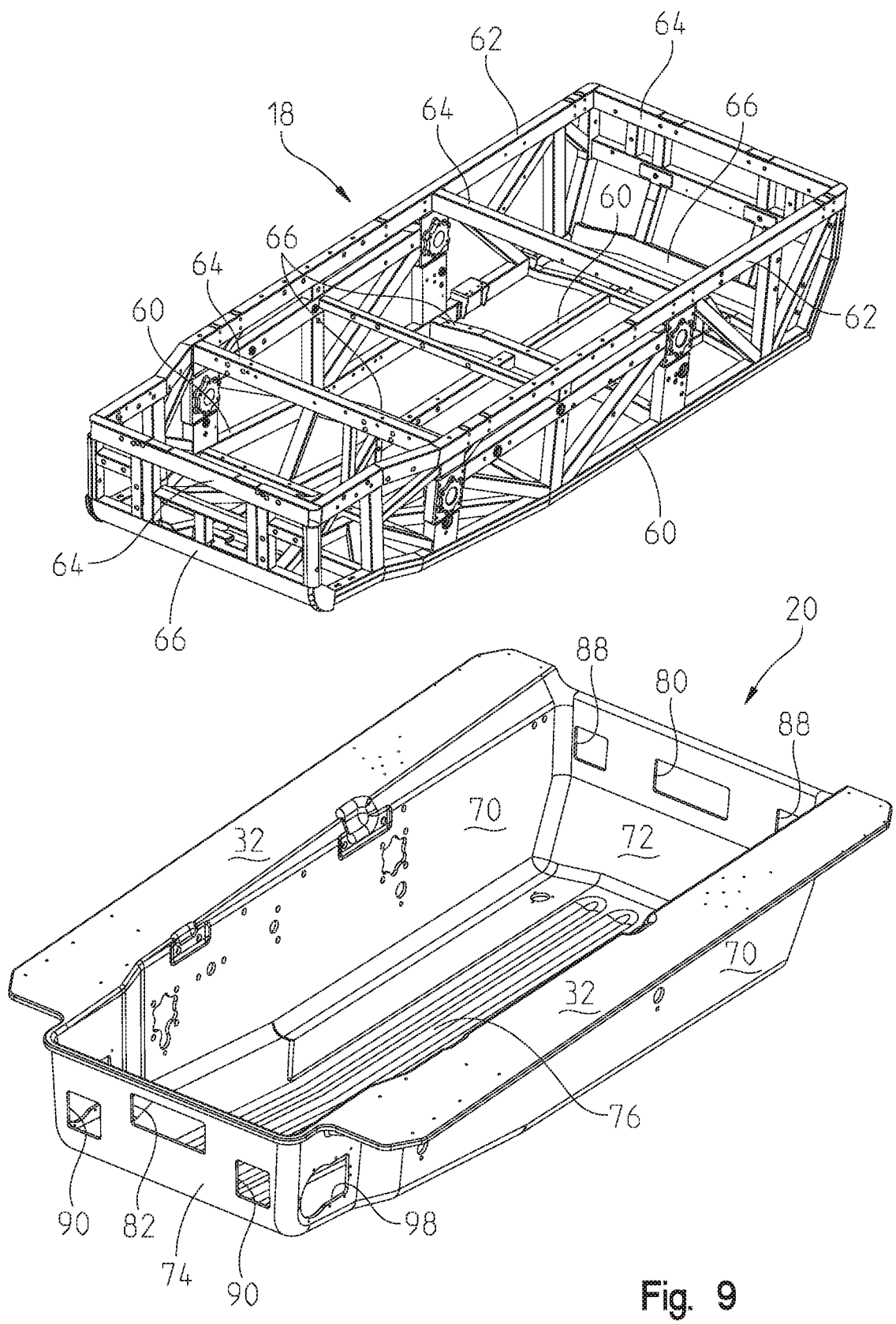
FIG. 9 is an exploded view of the frame assembly and the tub of FIG. 8.

Referring now to FIGS. 8-9, frame assembly 18 includes a plurality of lower longitudinal frame members 60, a plurality of upper longitudinal frame members 62, a plurality of upper cross members 64 and a plurality of lower cross members 66. Illustrative frame assembly 18 includes at least two lower longitudinal frame members 60, at least two upper longitudinal frame members 62, four upper cross members 64 and four lower cross members 66; however, frame assembly 18 may include varying quantities and arrangements of longitudinal frame members 60, 62 and cross members 64, 66. As shown, other braces are shown for rigidifying the frame and other brackets are provided for such means as mounting the engine and seats.

Illustratively, upper longitudinal frame members 62 are supported at a top surface of tub 20 and may be coupled together and coupled to tub 20 with conventional fasteners, such as structural bonds, welds, rivets, bolts, and adhesive. Lower longitudinal frame members 60 and cross members 66 are supported on a bottom wall 76 of tub 20. Lower longitudinal frame members 60 and cross members 66 may be coupled together and coupled to tub 20 with conventional fasteners, such as structural bonds, welds, rivets, bolts, and adhesive. In one embodiment, the longitudinal length of frame assembly 18 and tub 20 may be approximately 11.5 ft. (approximately 3.5 m) and the width of frame assembly 30 and tub 40 may be approximately 6.5 ft. (approximately 2.5 m).

Longitudinal frame members 60, 62 and cross frame members 64, 66 may be comprised of a metallic or polymeric material. Frame assembly 18 of FIGS. 8-9 may be comprised of an aluminum material, for example 6061-T6 Aluminum. Similarly, tub 20 may be comprised of an aluminum material, for example 5052-H32 Aluminum. Alternatively, at least a portion of frame assembly 18 and/or tub 20 may include ultra-high molecular weight polyethylene. Additionally, frame assembly 18 and/or tub 20 may include a marine-grade pourable urethane coating and/or foam material inserts in order to fill volume voids and resist water ingestion during amphibious operation. As such, frame assembly 18 and tub 20 are configured to minimize water accumulation within vehicle 10. Flotation devices, such as inflatable units, may also be included and secured to vehicle 10 to further increase the buoyancy of vehicle 10 during amphibious operation. In one embodiment, vehicle 10 is configured to float at approximately 1,600 kg without any urethane materials; however, urethane materials may increase the buoyancy of vehicle 10 during amphibious operation.

Referring still to FIGS. 8-9, tub 20 includes side walls 70, a rear wall 72, front wall 74, and bottom wall 76. Sidewalls 70 support fenders 32. Rear and front walls 72, 74 may include openings 80, 82 to receive tow bars 84, 86 (FIGS. 1-2) and openings 88, 90 to receive latches 92, 94 (FIGS. 1-2) which provides vehicle 10 with towing capabilities. Additional tie-downs, latches, hooks, or other members may be provided for attaching additional cargo or assisting with towing capacity. Illustrative vehicle 10 may have a towing capacity of approximately 500-1000 lbs. (approximately 227-450 kg). Side walls 70 of tub 20 include a plurality of openings. For example, side walls 70 include a plurality of axle openings 98 adjacent front wall 74.

Figure 10:
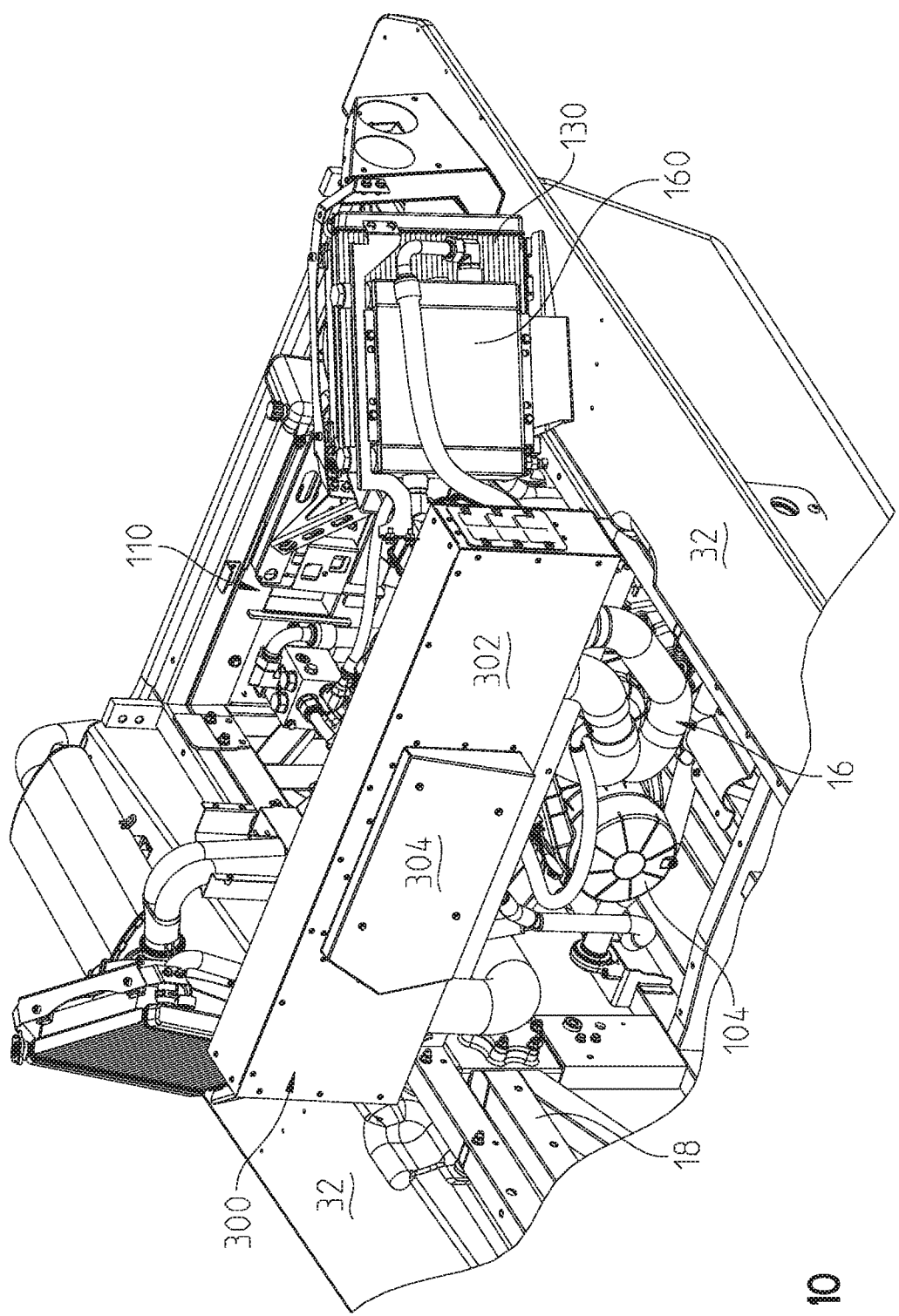
FIG. 10 is a left front fragmentary perspective view of the cooling system of the vehicle of FIG. 1.
Figure 11:
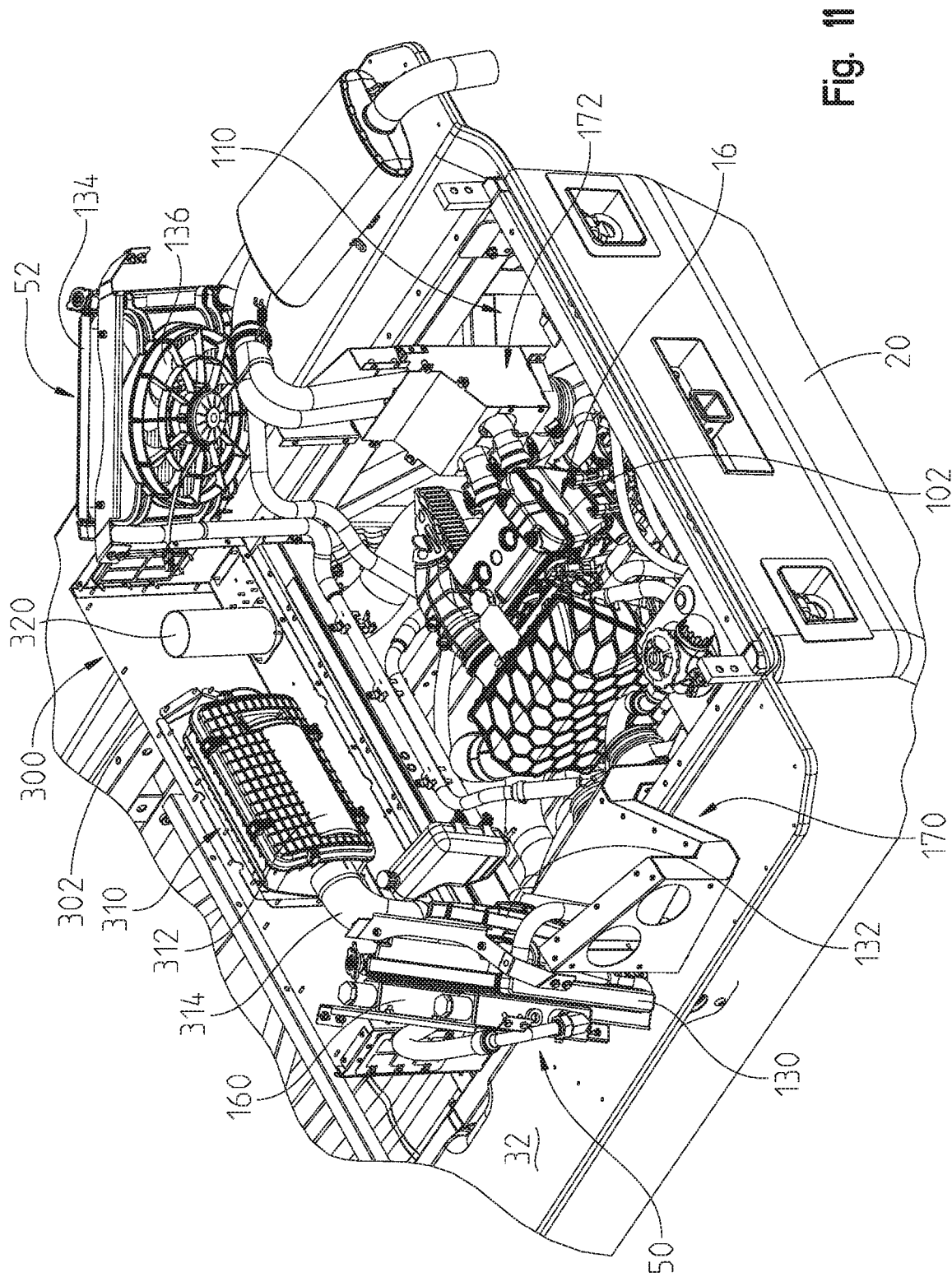
FIG. 11 is a left rear fragmentary perspective view of the cooling system of the vehicle of FIG. 1.
Figure 12:
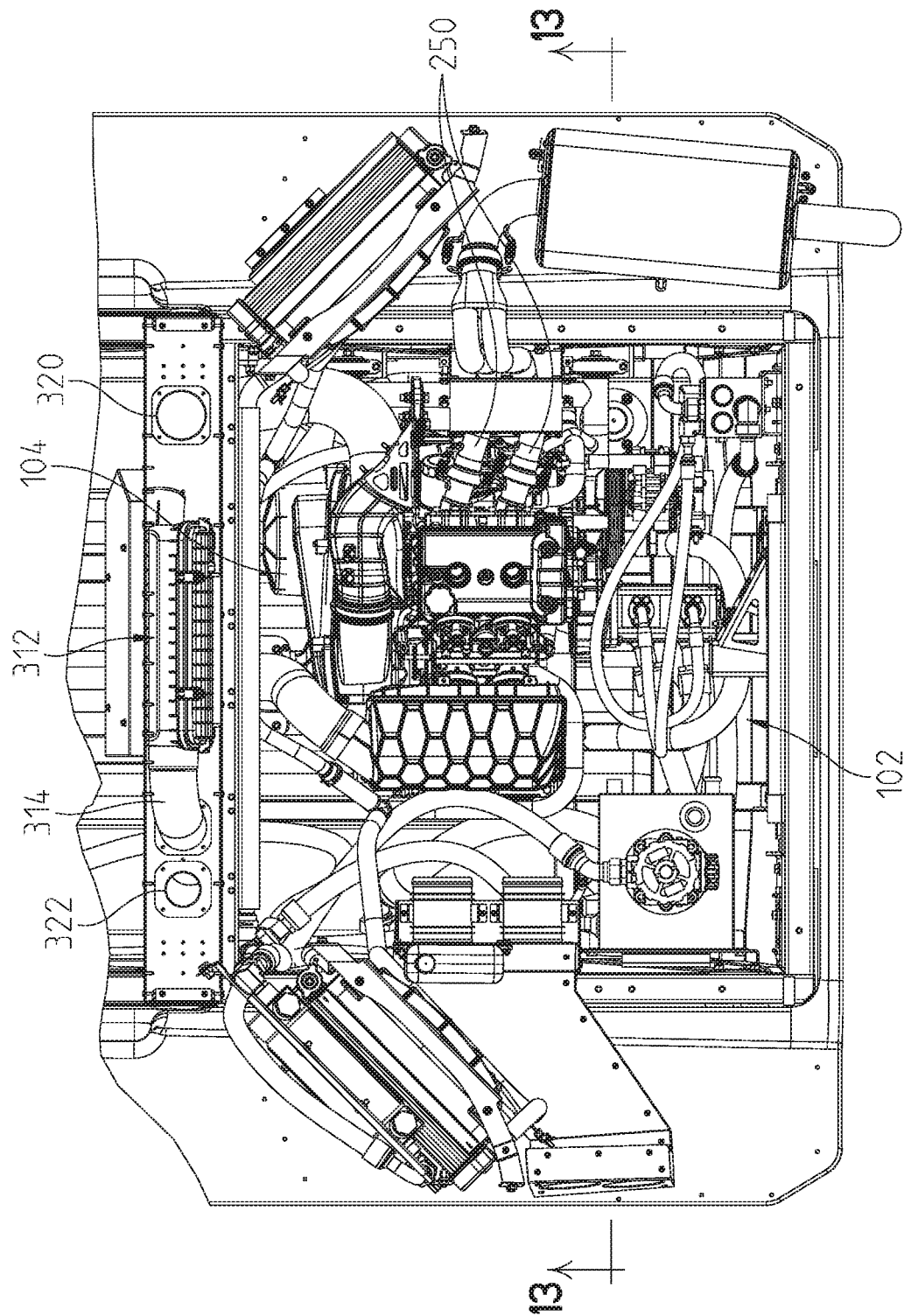
FIG. 12 is a top view of the cooling system of the vehicle of FIG. 1.
Figure 13:
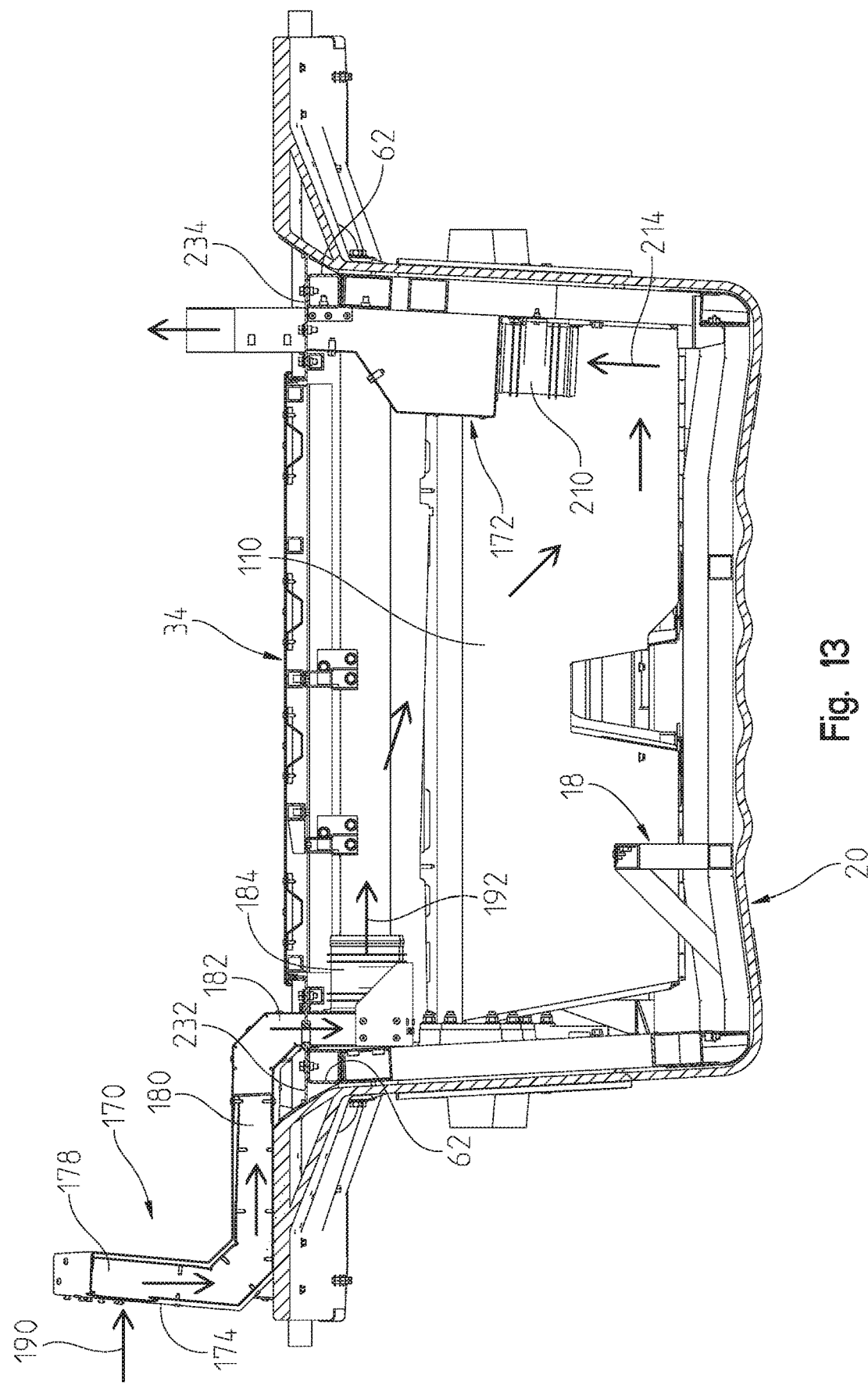
FIG. 13 is a cross-sectional view through lines 13-13 of FIG. 12, with the engine removed.

Referring to FIGS. 10-12, powertrain assembly 16 is supported by frame assembly 18 for driving tracks 12, 14 of vehicle 10. Powertrain assembly 16 includes an engine 102, a transmission 104 coupled to an output of engine 102, and a drive shaft (not shown) coupled to an output of transmission 104 for powering tracks 12, 14. Engine 102 and transmission 104 are positioned in an engine compartment 110 in a rear portion of vehicle 10 behind operator seat 38. In an exemplary embodiment, engine 102 is an internal combustion engine having an electronically controlled throttle valve controlled by an engine control unit (ECU). An exemplary engine control system is detailed further herein and in U.S. patent application Ser. No. 13/153,037, filed on Jun. 3, 2011, titled "ELECTRONIC THROTTLE CONTROL," the entire disclosure of which is incorporated by reference herein. Engine 102 may be of the type detailed in U.S. patent application Ser. No. 13/242,239, filed on Sep. 23, 2011, titled "ENGINE," the entire disclosure of which is incorporated by reference herein.

In the illustrated embodiment, transmission 104 may include an electronically controlled continuously variable transmission (CVT), which may be as detailed in U.S. patent application Ser. No. 13/652,253, filed on Oct. 15, 2012, the complete disclosure of which is incorporated by reference herein. Transmission 104 may be controlled by ECU or by another suitable controller, such as a transmission control unit. The output of transmission 104 may be operably coupled to a gearbox, where the output of the gearbox is drivingly coupled to the drive shaft. Additional details of the drive and/or steering of the vehicle 10 may be as described in U.S. patent application Ser. No. 14/225,206 filed Mar. 25, 2014, the subject matter of which is incorporated herein by reference.

With reference now to FIGS. 1, 2, 10 and 11, the first and second cooling systems 50, 52 will be described in greater detail. With reference first to FIGS. 1 and 2, cooling system 50 is mounted on left fender 32 above track 12 and rearward of operator compartment 36 and is rearward of seat 38. Chamber 54 includes an inlet grate 120 and an exit grate 122. Cooling system 52 is mounted above and coupled to right hand fender 32 above track 14 and is rearward of operator compartment 36 and seat 38. The chamber 56 includes an inlet grate 124 (FIG. 4) and an exit grate 126 (FIG. 2). As shown, grates 120 and 124 face forwardly and are angled outwardly away from a longitudinal center line of vehicle 10.

With reference now to FIGS. 10 and 11, cooling systems 50 and 52 are shown with the associated chambers 54 and 56 having been removed. It should be appreciated that the cooling systems 50 and 52 have multiple functions and will be described herein, where the functions include (1) providing a cooling function for the engine 102; (2) providing a cooling function for hydraulic components of the vehicle 10; (3) providing cooling for the engine compartment; and (4) providing a routing and enclosure for the exhaust system.

Figure 14:
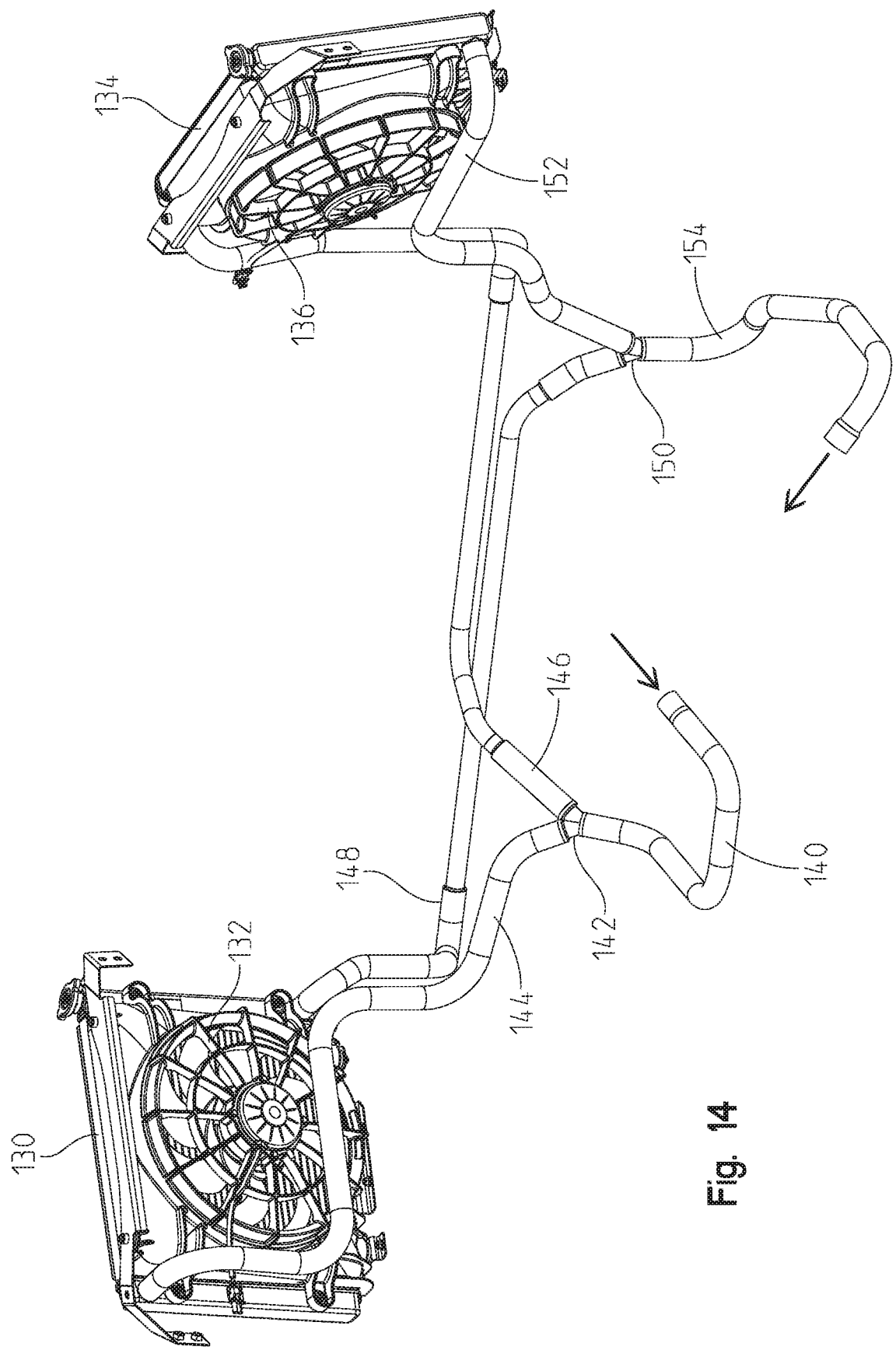
FIG. 14 shows a rear perspective view of the primary heat exchangers.

As shown best in FIG. 11, cooling system 50 first includes a radiator 130 having a rear mounted fan 132 and cooling system 52 includes a radiator 134 having a rear mounted fan at 136. The two radiators 130 and 134 provide together the cooling function for engine 102. With reference to FIG. 14, these two radiators are shown separately, but are shown directly coupled together by way of the radiator hoses. More particularly, a return line from the engine is provided through hose portion 140 which couples with a Y-coupler at 142, such that coolant is returned to radiator 130 through hose 144 and coolant is returned to radiator 134 through hose 146. In a similar way, coolant is supplied to engine 102 through hose 154, where coolant is fed from radiator 130 through hose 148 to Y-coupler 150 and from radiator 134 through hose 152 to Y-coupler 150. The two coolants join together at Y-coupler 150 and are provided to the engine 102. It should be appreciated that fans 132 and 136 draw air from the front through the rear of the vehicle and through chambers 54 and 56 respectively and through grates 120 and 124 exhausting the warm air through grates 122 and 126. It should also be appreciated that either or both of the fans 132, 136 may be controlled to run separately or together with the corresponding radiators 130 and 134 or intermittently to provide the proper coolant temperature. This provides the first objective of the engine cooling function described above.

In addition to the radiators 130 and 134, an auxiliary radiator 160 is provided and as shown in FIGS. 10 and 11 is positioned directly in front of radiator 130. In the present application, radiator 160 cools the hydraulic fluid which operates the hydraulic drive train, but in other embodiments such as an electric drive or hybrid vehicle version, the auxiliary radiator 160 could be used to cool electrical components in the system. It should be appreciated that the same fan 132 which draws cooling air through radiator 130 also draws cooling air through radiator 160. As the hydraulic fluid is kept at a lower temperature than the coolant water temperature which cools the engine, the temperature rise across the auxiliary heat exchanger 160 is not elevated significantly before passing across the radiator 130. In the present disclosure, the hydraulic fluid is kept 60° cooler than the engine coolant temperature. The fans are electronically controlled by measuring fluid temperatures to operate the fans 132 and 136. Thus auxiliary radiator 160 accomplishes the second objective of providing a cooling function for hydraulic components of the vehicle.

Figure 15:
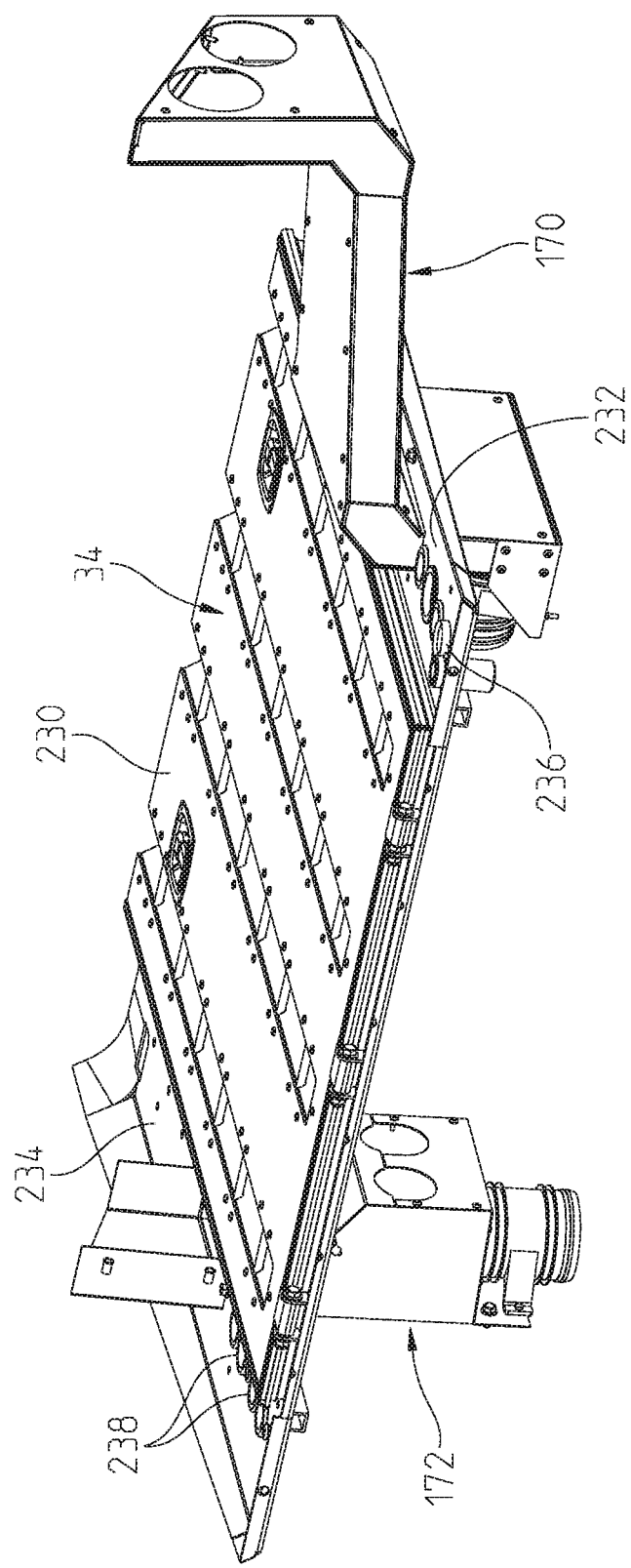
FIG. 15 shows a left front perspective view of the inlet and exhaust ducts in association with the rear platform deck.
Figure 16:
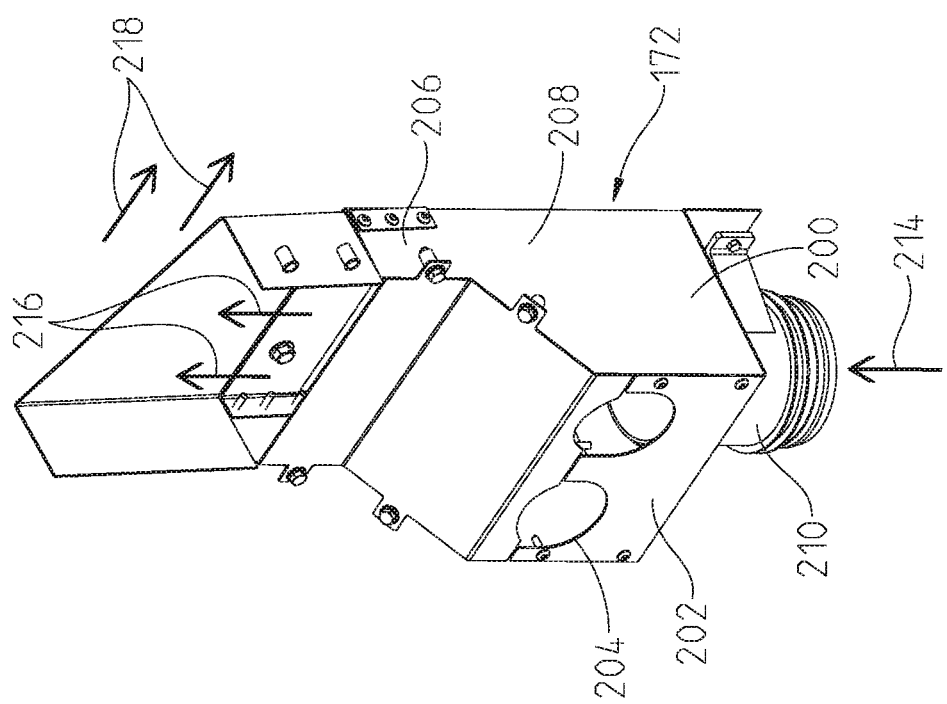
FIG. 16 shows a left rear perspective view of the inlet and exhaust ducts.
Figure 16:
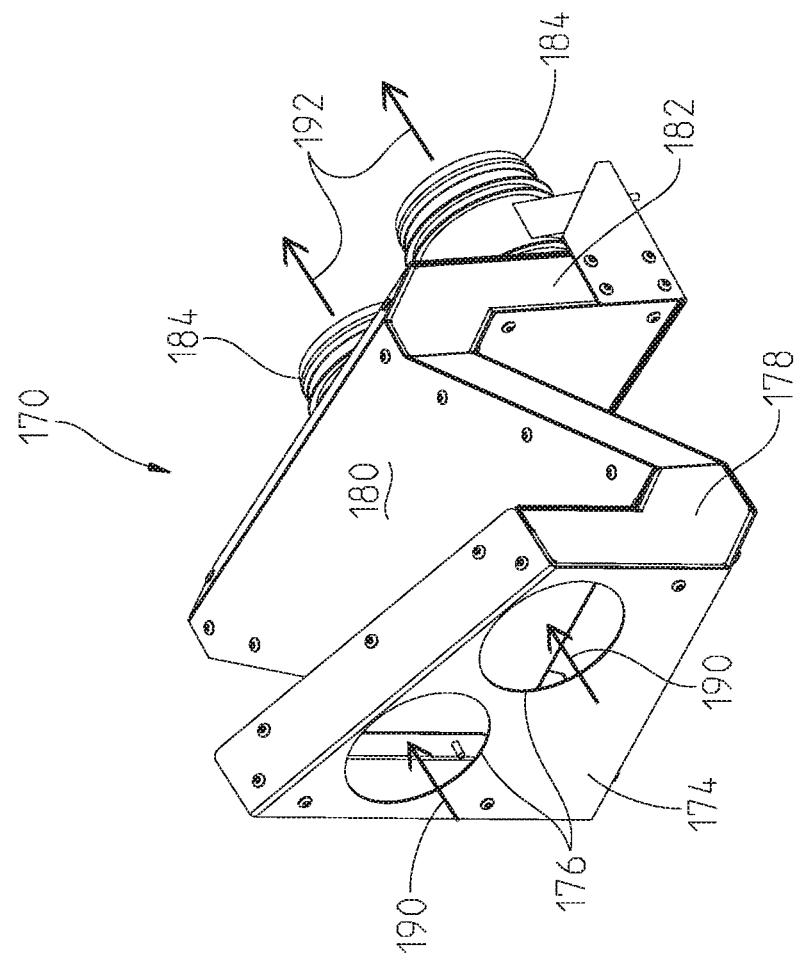

In an effort to cool the engine compartment 110 and with reference to FIGS. 11, 13 and 15-17, an intake duct 170 and an exhaust duct 172 are provided which extend out of the engine compartment 110 as described herein. With reference first to FIGS. 11 and 16, intake duct 170 is provided rearward of radiator 130 and includes an outer panel 174 having openings at 176 which allow air into a duct portion 178. Air flows through duct portion 178 into duct portion 180 and then downwardly through duct portion 182. Fans 184 are provided in duct portion 182 to draw air into the intake duct 174 in the direction shown by arrows 190 and into the engine compartment in the direction of arrows 192. Intake duct 170 is shown in cooperation with the engine compartment 110 as shown best in FIG. 13 where intake duct 170 is shown positioned over fender 32 and extends inside of frame 18 with duct portion 182 positioned inward of upper longitudinal frame rail 62. Thus, intake duct 170 provides a flow rate of ambient air into the engine compartment 110 by way of fans 184 pulling air into the engine compartment 110 through openings 176 of intake duct 170.

Figure 4:
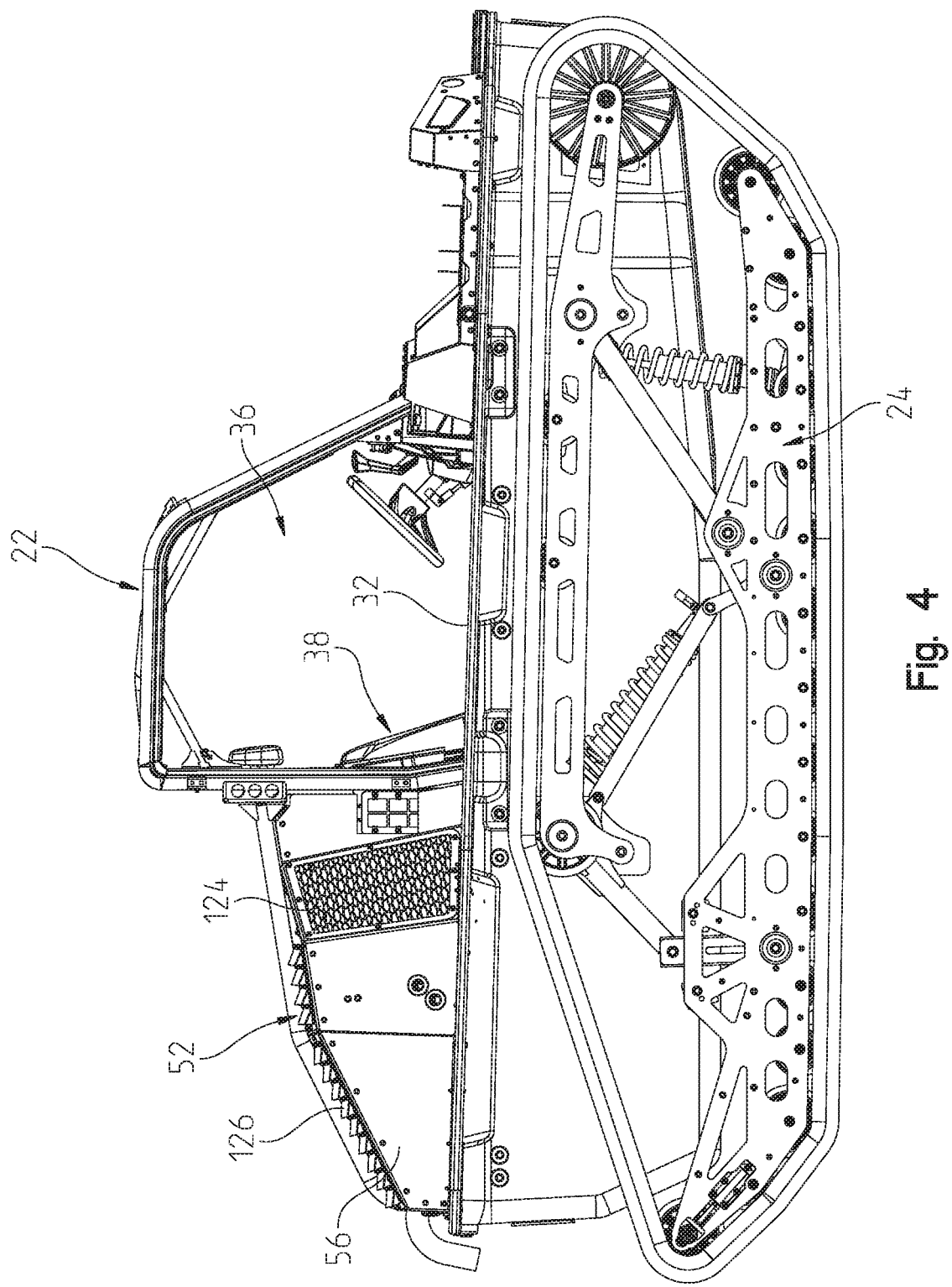
FIG. 4 is a right side view of the embodiment of the vehicle of FIG. 1.
Figure 5:
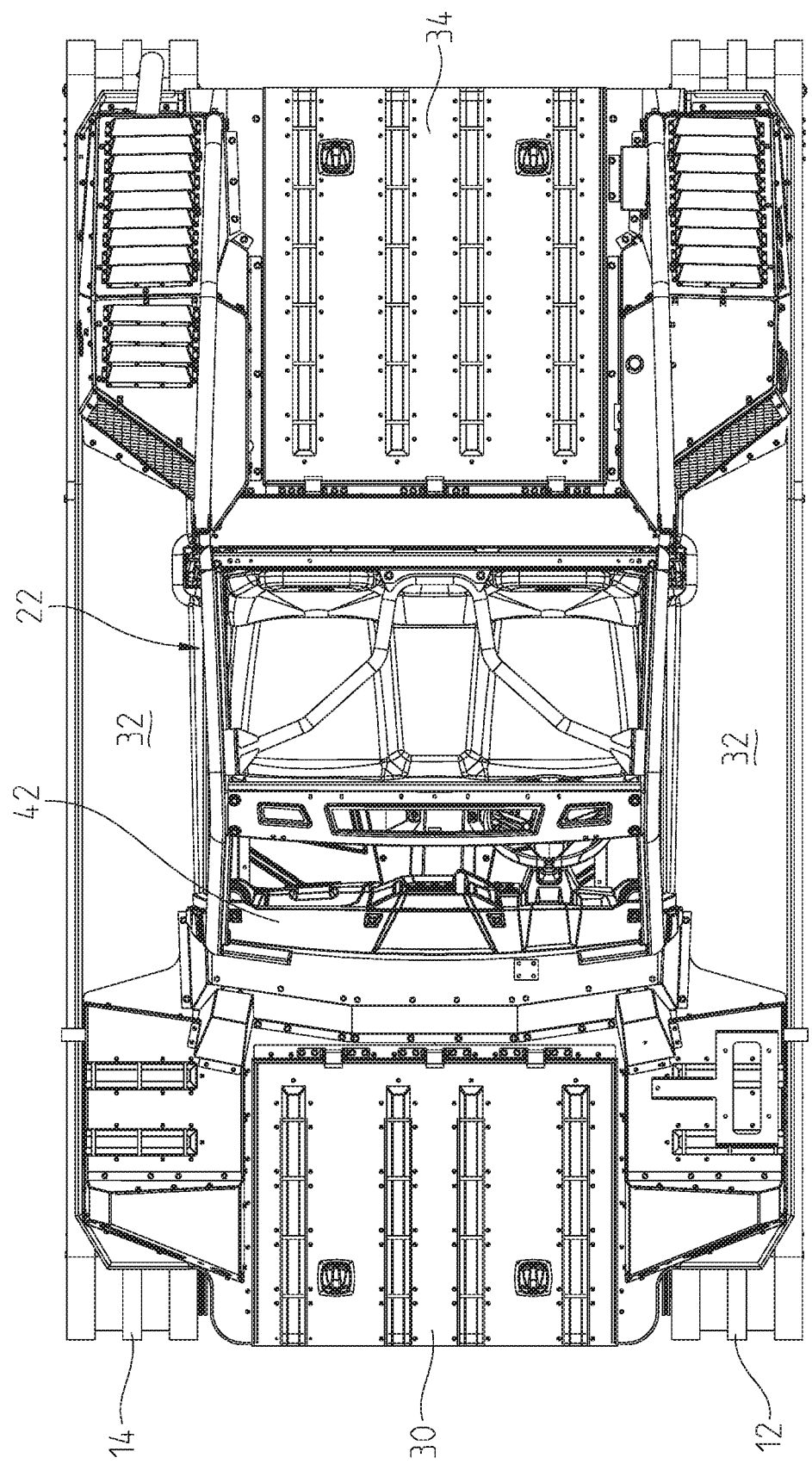
FIG. 5 is a top view of the embodiment of the vehicle of FIG. 1.
Figure 6:
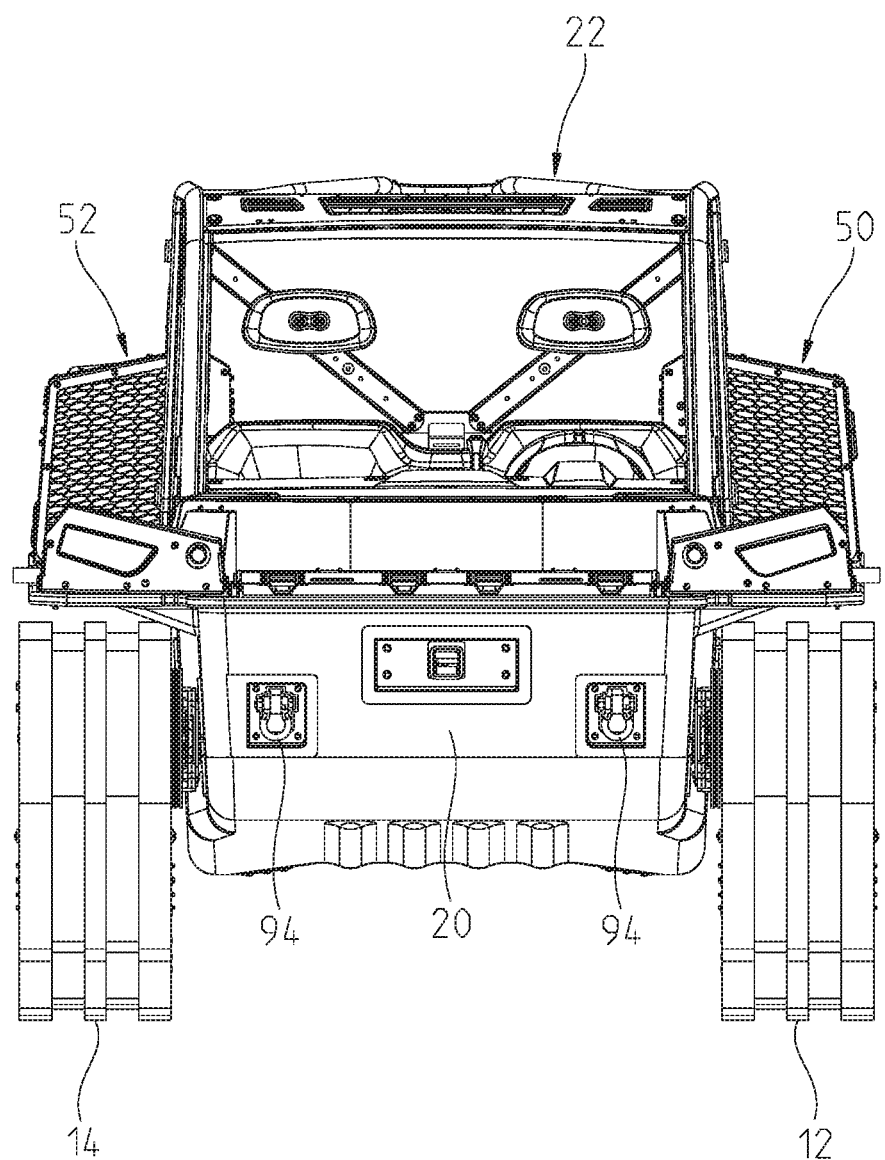
FIG. 6 is a front view of the vehicle of FIG. 1.
Figure 7:
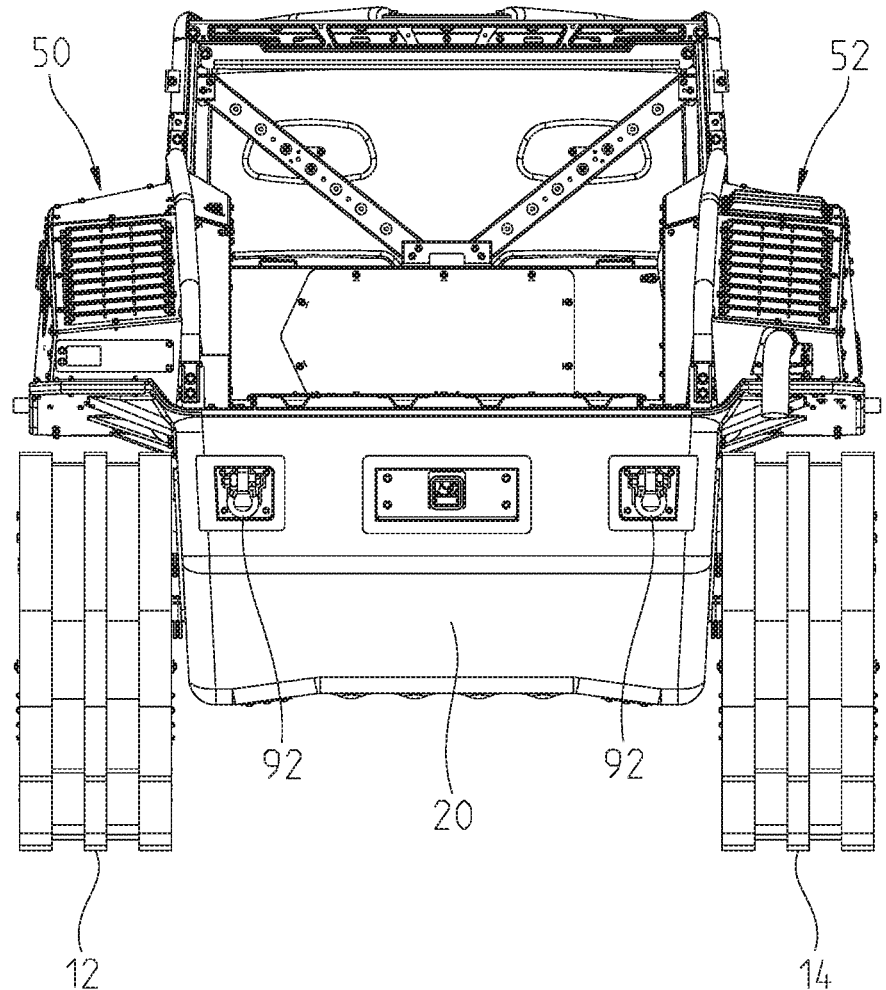
FIG. 7 is a rear view of the vehicle of FIG. 1.

Air is exhausted from the engine compartment 110 by way of exhaust duct 172 having a lower duct portion 200 (FIG. 16) having an inwardly directed face 202 having openings at 204. Duct portion 202 transitions to a constricted portion 206 by way of a necked-down portion at 208. A fan 210 is provided on a lower face of duct portion 202 such that air is drawn into exhaust duct 172 as shown at arrows 214 and exhausted through exhaust duct as shown by arrows 216, 218. It should be appreciated that fan 136 (FIG. 11) helps provide a vacuum effect of air flowing upwardly through exhaust portion 200 from engine compartment 110 and rearwardly through the exit grates 124 (FIG. 4). In addition, the necked-down portion provides a Venturi effect of the air being drawn out of the engine compartment and into the chamber 52.

Figure 17:
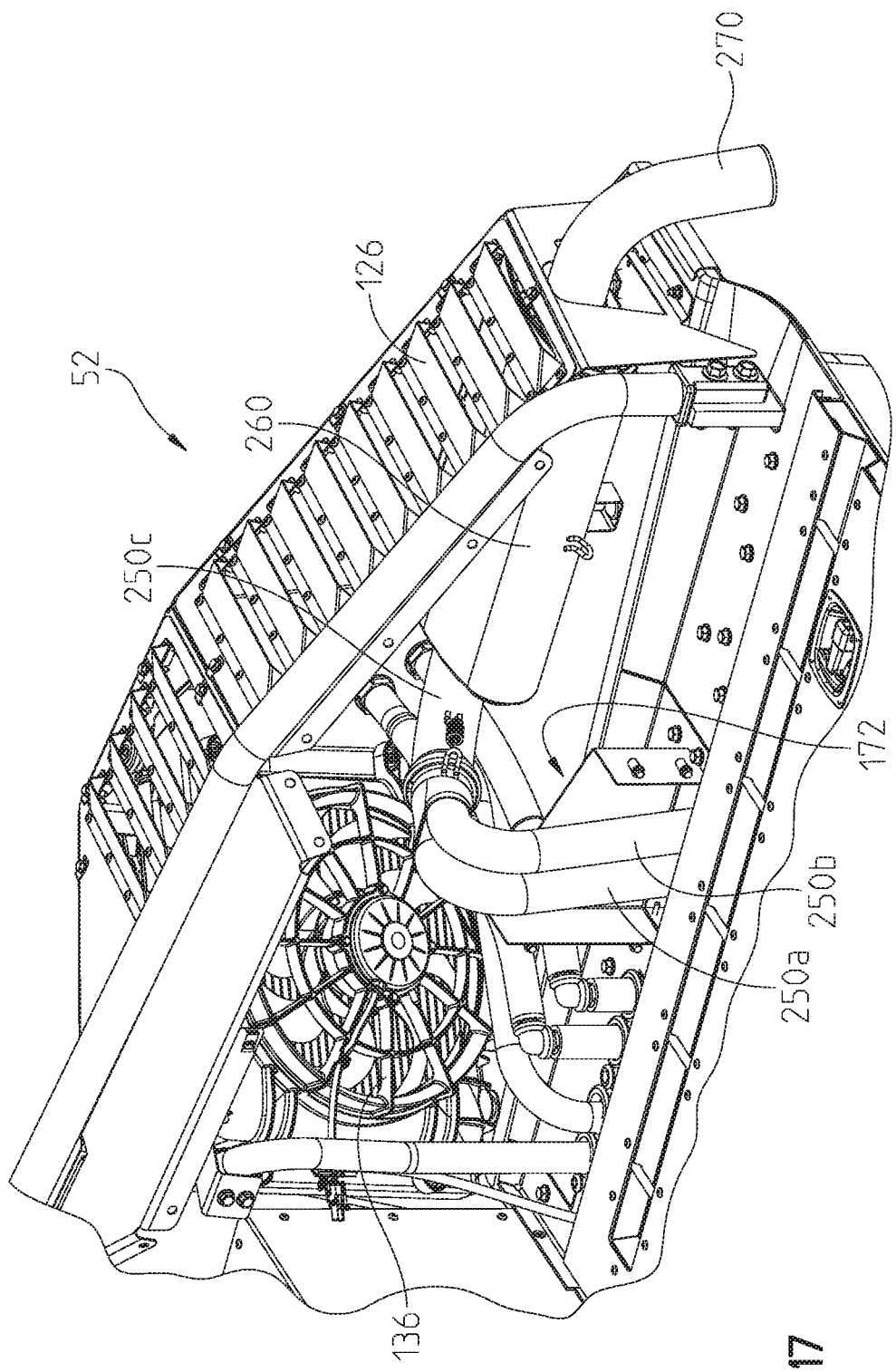
FIG. 17 is a left rear perspective view of the inlet and exhaust ducts positioned in the right rear chamber.

As shown in FIG. 15, the intake and exhaust ducts 170 and 172 are shown in association with rear deck 34. As shown, rear deck 34 includes an upper decking portion 230 for storage and side mounts 232 and 234 through which ducts 170 and 172 extend. Side mount 232 includes apertures such as 236 to receive the various hoses of heat exchangers 130 and 160 and side mount 234 includes apertures such as 238 for receipt of hoses for radiator 134. Otherwise, rear deck 34 including side mounts 232 and 234 conform to the frame 18 and tub 20 to seal the upper deck to the tub. FIG. 15 shows that a portion of each of the ducts 170 and 172 extends in the engine compartment 110 and a portion extends into its associated chamber 50, 52. Thus, duct 170 together with fans 184 brings ambient air into the engine compartment 110, while duct 172 and fan 210 removes the hot air from the engine compartment and into the chamber 52. Fan 136 helps exhaust the hot air from the chamber 52 to be ejected through the rear grates 126 (FIG. 17). This achieves the third objective of cooling the engine compartment.

With reference now to FIGS. 12 and 17, chamber 52 also assists in the routing of the exhaust for engine 102. As shown in FIG. 12, the associated engine 102 is a two cylinder engine having exhaust tubes at 250 extending to the right side of engine 102 and including a portion of exhaust tubes 250 extending into openings 204 (FIG. 16). As shown best in FIG. 17, portions 250A and 250B of the exhaust tubes extend upwardly from the engine compartment through duct 172 and then rearwardly through portion 250C to couple with muffler 260. Muffler 260 has a tail pipe portion at 270 extending out of the chamber 52 to expel the exhaust outside of the chamber 52. It should be appreciated that fan 136 not only assists in drawing the air out of engine compartment 110 upwardly through duct 172, but also moves air from the radiator rearwardly across the muffler 260 outwardly through grate 126. This achieves the fourth objective of routing the exhaust mentioned above.

As shown in FIGS. 10-12, vehicle 10 also includes an air handling section 300 illustratively partially positioned below rear cargo area 34 and rearward of seat 38. Air handling section 300 includes a wall 302 having an intake duct at 304. On the back side of wall 302, an air intake assembly 310 is provided, which includes an air filter box 312 and air manifold 314. Air intake assembly 310 is elevated relative to the rear deck 34 and relative to the tops of track members 12, 14 such that air filter box 312 is not submerged or otherwise affected during amphibious operation of vehicle 10.

In addition, air handling section comprises two snorkel tubes 320 and 322 (FIG. 12), where one of the tubes is for CVT cooling air and one is for exhausting the CVT air. As shown, snorkel tubes 320 and 322 extend above the rear rack 34 to ensure that the air intake is above a water line when in amphibious mode.

An operation of a drive assembly, hydraulic motor, and steering gear assembly based on the steering input is detailed further in U.S. patent application Ser. No. 11/965,165, filed Dec. 27, 2007, titled "SKID STEERED ALL TERRAIN VEHICLE," the entire disclosure of which is incorporated by reference herein. Other aspects of the vehicle may be described in patent application Ser. No. 14/225,206, filed on Mar. 25, 2014, the entire disclosure of which is incorporated by reference herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle, comprising:
   a frame;
   ground engaging members supporting the frame;
   an operator compartment supported by the frame;
   an engine compartment rearward of the operator area;
   a first radiator positioned rearward of the operator area on a first lateral side of the vehicle;
   a second radiator positioned rearward of the operator area on a second lateral side of the vehicle;
   a third radiator positioned in front of one of the first or second radiators; and
   a first fan and a second fan positioned adjacent a respective one of the first and second radiators;
   wherein the first and second radiators are fluidly coupled together and to the engine for cooling the engine.

2. The vehicle of claim 1, wherein the first and second radiators are also above a top of the engine.

3. The vehicle of claim 2, wherein the first and second radiators angle outwardly from a longitudinal centerline of the vehicle.

4. The vehicle of claim 1, wherein the third radiator cools a hydraulic or electrical system in the vehicle.

5. The vehicle of claim 4, wherein the vehicle is a track type vehicle and the hydraulic system steers the track.

6. The vehicle of claim 4, wherein the vehicle is a track type vehicle and the electrical system drives and steers the track.

7. The vehicle of claim 1, wherein the fans are independently controllable.

8. The vehicle of claim 1, wherein the first fan and first radiator are enclosed by a first chamber.

9. The vehicle of claim 8, wherein the second fan and second radiator are enclosed by a second chamber.

10. The vehicle of claim 9, wherein the first and second chambers are vented to exhaust air caused by the operation of the fans.

11. The vehicle of claim 1, wherein the engine compartment is enclosed.

12. The vehicle of claim 11, further comprising an input duct inputting ambient air into the engine compartment and an exhaust duct exhausting air from the engine compartment.

13. The vehicle of claim 12, further comprising an input fan to draw air into the engine compartment through the input duct, and an exhaust fan to exhaust air through the exhaust duct.

14. The vehicle of claim 13, wherein the input air is drawn through an input chamber and the exhaust air is exhausted through an exhaust chamber.

15. The vehicle of claim 14, wherein the input duct is at least partially enclosed by the input chamber and the exhaust duct is at least partially enclosed by the exhaust chamber.

16. The vehicle of claim 15, wherein the input duct is at least partially enclosed by the engine compartment and the exhaust duct is at least partially enclosed by the engine compartment.

17. The vehicle of claim 16, wherein a top of the input duct and the exhaust duct is above a waterline of the vehicle when in amphibious mode.

18. The vehicle of claim 16, wherein the engine includes an exhaust system comprising at least one exhaust pipe, and the exhaust pipe is routed through the exhaust duct.

19. The vehicle of claim 18, wherein the exhaust system further comprises a muffler, the muffler being enclosed by the exhaust chamber.

20. A vehicle, comprising:
   a frame;
   ground engaging members supporting the frame;
   an operator compartment supported by the frame;
   an engine compartment rearward of the operator area, the engine compartment being enclosed;
   an input duct inputting ambient air into the engine compartment;
   an exhaust duct exhausting air from the engine compartment;
   an input fan to draw air into the engine compartment through the input duct; and
   an exhaust fan to exhaust air through the exhaust duct.

21. The vehicle of claim 20, wherein the input air is drawn through an input chamber and the exhaust air is exhausted through an exhaust chamber.

22. A vehicle, comprising:
a frame;
ground engaging members supporting the frame;
an operator area supported by the frame;
an engine compartment rearward of the operator area, the engine compartment being enclosed;
an input duct inputting ambient air into the engine compartment; and
an exhaust duct exhausting air from the engine compartment, wherein the input duct is at least partially enclosed by an input chamber and the exhaust duct is at least partially enclosed by an exhaust chamber.

23. The vehicle of claim 22, wherein the input duct is at least partially enclosed by the engine compartment and the exhaust duct is at least partially enclosed by the engine compartment.

24. The vehicle of claim 22, wherein the engine includes an exhaust system comprising at least one exhaust pipe, and the exhaust pipe is routed through the exhaust duct.

25. The vehicle of claim 24, wherein the exhaust system further comprises a muffler, the muffler being enclosed by the exhaust chamber.

26. The vehicle of claim 23, wherein the exhaust duct has a first cross sectional area open to the engine compartment and a second cross sectional area open to the exhaust chamber, where the first cross sectional area is larger than the second cross sectional area.

27. A vehicle, comprising:
a frame;
ground engaging members supporting the frame;
an operator compartment supported by the frame;
an engine compartment rearward of the operator area, the engine compartment being enclosed;
an input duct inputting ambient air into the engine compartment;
an exhaust duct exhausting air from the engine compartment;
a first radiator positioned rearward of the operator area on a first lateral side of the vehicle;
a second radiator positioned rearward of the operator area on a second lateral side of the vehicle;
wherein the first and second radiators are fluidly coupled together and to the engine for cooling the engine.

28. The vehicle of claim 27, wherein the first and second radiators are also above a top of the engine.

29. The vehicle of claim 28, wherein the first and second radiators angle outwardly from a longitudinal centerline of the vehicle.

30. The vehicle of claim 27, further comprising a third radiator positioned in front of one of the first or second radiators.

31. The vehicle of claim 30, wherein the third radiator cools a hydraulic or electrical system in the vehicle.

32. The vehicle of claim 31, wherein the vehicle is a track type vehicle and the hydraulic system steers the track.

33. The vehicle of claim 31, wherein the vehicle is a track type vehicle and the electrical system drives and steers the track.

34. The vehicle of claim 27, further comprising first and second fans positioned adjacent to the first and second radiators.

35. The vehicle of claim 34, wherein the fans are independently controllable.

36. The vehicle of claim 34, wherein the first fan and first radiator are enclosed by a first chamber.

37. The vehicle of claim 36, wherein the second fan and second radiator are enclosed by a second chamber.

38. The vehicle of claim 37, wherein the first and second chambers are vented to exhaust air caused by the operation of the fans.

39. The vehicle of claim 11, wherein the vehicle is a track type vehicle.

40. The vehicle of claim 1, further comprising a coolant return line connected to both of the first and second radiators in fluid communication; and a coolant supply line connected to both of the first and second radiators, and to an engine of the vehicle in fluid communication.

41. A vehicle, comprising:
a frame;
ground engaging members supporting the frame;
an operator compartment supported by the frame;
an engine compartment rearward of the operator area, the engine compartment being enclosed;
an input duct inputting ambient air into the engine compartment;
an exhaust duct exhausting air from the engine compartment, wherein the exhaust duct is separated from the input duct and disposed on an opposite side with respect to the engine compartment.

* * * * *

UNITED STATES PATENT AND TRADEMARK OFFICE
CERTIFICATE OF CORRECTION

PATENT NO. : 10,569,642 B2  
APPLICATION NO. : 15/187368  
DATED : February 25, 2020  
INVENTOR(S) : Eric Borud, Brian M. Safranski and Bradley A. Bracht Page 1 of 1

It is certified that error appears in the above-identified patent and that said Letters Patent is hereby corrected as shown below:

In the Claims

Claim 25 replace the word "muffer" with "muffler".

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*